UNITED STATES PATENT OFFICE.

KARL BASIL EDWARDS, OF LONDON, ENGLAND.

MANUFACTURE OF ARSENICAL COMPOUNDS.

1,422,945.  Specification of Letters Patent.  Patented July 18, 1922.

No Drawing. Original application filed January 26, 1921, Serial No. 440,168. Divided and this application filed October 22, 1921. Serial No. 509,750.

*To all whom it may concern:*

Be it known that I, KARL BASIL EDWARDS, a subject of the King of Great Britain, residing at Corner House, North Park, Eltham, London, England, have invented new and useful Improvements Relating to the Manufacture of Arsenical Compounds, of which the following is a specification.

This application is a division of my application for patent, Serial No. 440,168, filed Jan. 26, 1921.

This invention relates to a process for the manufacture of salts possessing the formula $R_3AsS_4$, where R is an alkali metal or ammonium.

This invention has for its object a process which can be carried out on a large scale in which the yields obtained are quantitative and products can be obtained which are uncontaminated with all forms of trivalent arsenic.

According to this invention salts of the above formula are prepared by boiling arsenic trisulphide with a solution of an alkaline polysulphide.

The arsenic trisulphide should be free from precipitated sulphur and if the proportions present are one molecular equivalent arsenic trisulphide, three molecular equivalents alkaline monosulphide and one molecular equivalent sulphur, pentavalent arsenic compounds are produced only.

Example: 72 parts of crystalline sodium monosulphide are dissolved in two thirds of their weight of water and 6.4 parts of sulphur are added and the mixture boiled until the sulphur is dissolved. The solution is cooled and 24.6 parts of arsenic trisulphide is added cautiously. A violent reaction takes place and the yellow colour of the solution disappears. The solution is boiled until the arsenic trisulphide is completely dissolved when the resulting solution should be colourless and clear.

$Na_3AsS_4$ is produced which forms white crystals containing 9 molecules of water which can be evaporated to the anhydrous condition. If the sulphur is not dissolved in the sodium sulphide before adding the arsenic trisulphide, thio or sulph-arsenites will be produced which cannot then be converted to thio-arsenates. If the sulphur and the arsenic trisulphides are added together the same applies.

The material can be dissolved in water and a solution of the sodium salt containing arsenic equivalent to .15% $As_2O_3$ has been found efficacious and safe for the purpose of destroying parasites externally.

What I claim is:—

1. A process for the manufacture of salts of the formula $R_3AsS_4$, where R is an alkali metal or ammonium, which comprises treating arsenic trisulphide with a solution of an alkali polysulphide in the proportions of one molecular equivalent arsenic trisulphide, three molecular equivalents alkaline monosulphide and one molecular equivalent sulphur.

2. A process for the manufacture of salts of the formula $R_3AsS_4$, where R is an alkali metal or ammonium, which comprises treating arsenic trisulphide with a solution of an alkali polysulphide in the proportions of one molecular equivalent arsenic trisulphide, three molecular equivalents alkaline monosulphide and one molecular equivalent sulphur, and reducing the salts to an anhydrous condition.

3. A process for the manufacture of salts of the formula $R_3AsS_4$, where R is an alkali metal or ammonium, which comprises boiling a solution of an alkaline monosulphide with sulphur until the latter is dissolved, cooling the solution, adding arsenic trisulphide, boiling the solution, and reducing the salts to an anhydrous condition.

In testimony that I claim the foregoing as my invention I have signed my name this 7th day of October, 1921.

KARL BASIL EDWARDS.